United States Patent [19]

Craig

[11] 4,009,966
[45] Mar. 1, 1977

[54] HEADLAMP FOCUSING METHOD

[75] Inventor: Gale M. Craig, Anderson, Ind.

[73] Assignee: General Motors Corporation, Detroit, Mich.

[22] Filed: Sept. 24, 1975

[21] Appl. No.: 616,384

[52] U.S. Cl. .................................. 356/123; 356/122
[51] Int. Cl.² ........................................... G01J 1/00
[58] Field of Search ................. 356/121, 122, 123; 33/180 L; 240/41 BM

[56] References Cited

UNITED STATES PATENTS

| | | | |
|---|---|---|---|
| 1,894,911 | 1/1933 | Morgan et al. | 356/122 |
| 3,614,439 | 10/1971 | Beelik et al. | 356/138 |
| 3,732,415 | 5/1973 | Lindae | 240/41 BM |
| 3,918,814 | 11/1975 | Weiser | 356/172 |

Primary Examiner—John K. Corbin
Assistant Examiner—R. A. Rosenberger
Attorney, Agent, or Firm—J. C. Evans

[57] ABSTRACT

A headlamp with a parabolic reflector has a filament mounted on lead wires attached to a support disc which is slidably and angularly adjustable within a cylindrical ferrule attached to the reflector so as to permit positioning the filament at the reflector focal point whereupon light from the filament will be reflected as a parallel beam from the reflector. The invention contemplates an improved method for focusing the filament including locating a planar mirror on the optical axis of the parabolic reflector for redirecting light parallel to the optical axis from the reflector back to the focal point of the mirror and wherein terminals of the filament are electrically connected to a power supply and to a meter to detect electrical resistance changes in the filament to indicate location of the filament at the focal point where light rays reflected from the flat planar mirror directly impinge on the filament to cause increase in its electrical resistance.

3 Claims, 6 Drawing Figures

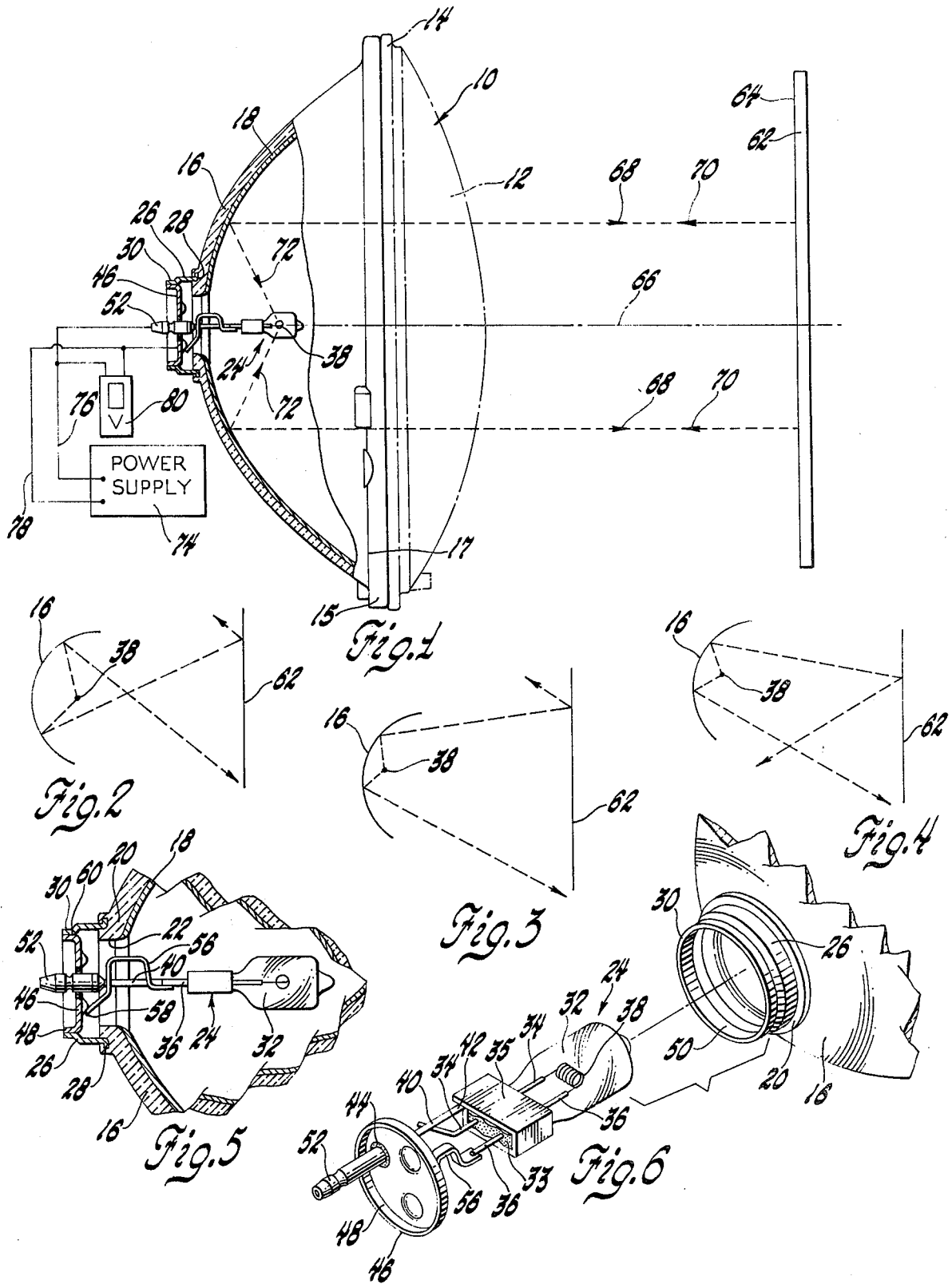

HEADLAMP FOCUSING METHOD

This invention relates to an improved arrangement for positioning a light emitting filament at a focal point of a parabolic mirror and more particularly to an improved method for positioning a light emitting filament with respect to the focal point of a parabolic mirror by detecting changes in the electrical properties of the filament itself.

Prior prefocusing arrangements to locate a light emitting filament at a focal point of a parabolic reflector have included the use of photocells that are located to pick up parallel light beams from a parabolic reflector to indicate the location of the light emitting filament at the focal point of the reflector. An example of such a system is set forth in U.S. Pat. No. 3,356,854 issued Dec. 5, 1967, to Humphrey.

Another approach to locating a light emitting filament with respect to a curved reflector surface is attained by aiming a beam of radiant energy at the filament from a predetermined angle. The position of the filament with respect to the reflector surface is checked by observing the orientation of a reflected shadow from the reflector surface onto a reference screen. An example of this system is set forth in U.S. Pat. No. 3,194,626 issued July 13, 1965, to Hoffman.

While the aforesaid arrangements are suitable for the intended purpose, they rely upon an optical indication of the prefocused location of the filament with respect to the reflector surface.

Accordingly, an object of the present invention is to utilize the electrical resistance properties of a light emitting filament in a lamp to indicate its location at the focal point of a parabolic lamp reflector.

Yet another object of the present invention is to provide an improved method for locating a light emitting filament at the focal point of a parabolic reflector without requiring deformation of filament support members.

Yet another object of the present invention is to provide an improved method for locating a light emitting filament at the focal point of a parabolic reflector by an improved method including the steps of adjustably positioning a filament support member for axial and angular movement with respect to a reflector base reference surface and while the bulb is energized, intercepting reflected light from the reflector by means of an optically flat mirror positioned on the optical axis of the reflector, electrically sensing changes in the resistance of the light emitting filament and fixedly locating the filament support member with respect to the reference surface when deflected light rays are redirected directly from the planar mirror back to the filament so as to increase the resistance of the filament to a maximum extent indicating location thereof at the focal point of the parabolic reflector.

Still another object of the present invention is to provide an improved filament support member and reflector mirror support assembly for a filament including a support for the filament with a peripheral flange adjustably supported on a ferrule connected to an integrally formed boss on the reflector defining an access opening through the reflector so as to permit axial and transverse adjustment of a filament carried by the filament support and coacting surfaces on the ferrule and support member being securable to fix the filament support axially and angularly within the ferrule when the filament is positioned at the reflector focal point.

Further objects and advantages of the present invention will be apparent from the following description, reference being had to the accompanying drawings wherein a preferred embodiment of the present invention is clearly shown.

FIG. 1 is an elevational view, partially in section, showing the reflector and filament mount assembly of the present invention in association with apparatus for prefocusing a filament with respect to the reflector;

FIGS. 2, 3 and 4 are diagrammatic views illustrating different optical effects produced by different filament locations relative to the focal point of the parabolic reflector and the optical flat mirror component in FIG. 1;

FIG. 5 is an enlarged, fragmentary, sectional view showing the support arrangement of the filament once it has been secured at the focal point of the parabolic reflector; and FIG. 6 is an exploded, perspective view of the filament and reflector mounting assembly illustrated in FIGS. 1 and 5.

Referring now to the drawings, in FIG. 1 a headlamp 10 is illustrated including a lens 12 with a peripheral flange 14 thereon fused to the peripheral flange 15 of the open end 17 of a parabolic reflector 16. The reflector includes an inner surface or coating 18 of a reflective material, preferably a bright metallic deposit. The reflector 16 may be constructed of glass and is suitably molded to provide a configuration having the desired optical properties. In accordance with certain principles of the present invention, the reflector 16 includes an annular integral boss 20 thereon defining an access opening 22 through the reflector 16 for location of a light bulb assembly 24. The boss 20 has a ferrule 26 with a thin inboard edge 28 that is sunk into the boss 20 of the reflector 16 when it is in a plastic state. The ferrule 26 further includes an outwardly located annular reference flange 30 thereon which is fixedly secured to the lamp bulb assembly 24 when it is located at the focal point of the reflector 16 following practice of the improved method of the present invention.

The lamp assembly 24 includes a glass bulb 32 having a base 33 thereon of generally rectangular configuration surrounded by a metallic foil member 35. The base 33 has first and second electrical terminals 34, 36 extending therefrom and interiorly of the bulb 32. An electrically energizable light emitting filament 38 is connected across the respective terminals 34, 36. In the illustrated arrangement a terminal lead in the form of an elongated pin 40 is fixedly secured at 42 to one side of the foil 35. The pin 40 is electrically connected to a bent segment on the terminal 34 and extends through an electrical insulating glass seal 44 on a lamp assembly support disc 46. The support disc 46 includes an axially directed peripheral flange 48 thereon that is slidably received within an annular inner surface 50 of the reference flange 30 on the ferrule 26 to allow for displacement of disc axis to ferrule axis up to about 5°.

An enlarged diameter connection pin 52 is supported by the glass seal 44 to be electrically insulated from the disc 46. The disc 46 is electrically connected to the opposite terminal 36 by means of a bent connector lead 56 having one end connected to the end of the terminal 36 and the opposite end welded to the inner surface of the disc 46 at 58 as best seen in FIG. 5.

The lamp assembly 24 is thereby supported for movement with respect to the reflective inner surface or coating 18 on the parabolic reflector member 16.

When it is at a prefocused position it is easily fixed therein by welding the reference flange 26 to the axially directed flange 48 as at 60 in FIG. 5.

In practicing the method of the present invention a plain optically flat mirror 62 has its reflector surface 64 located perpendicular to the optical axis 66 of the reflector 16. This is accomplished by suitable fixture means.

Given a concave parabolic reflector surface such as the coating 18 on the reflector 16 a source of light such as an electrically energized filament 38 located in the general vicinity of the focal point of the parabolic reflector 16 light rays will be reflected in a pattern from the coating 18 so that the light rays from the coating 18 will pass outwardly therefrom in spaced parallelism as shown by the arrows 68 in FIG. 1. Since the plain mirror 62 has its reflective surface 64 oriented normally with respect to the optic axis 66, light from the light emitting filament 38 will strike the reflector surface 64 and will follow paths parallel to the optic axis as indicated by the arrow 70 in FIG. 1. This redirected light is reflected along the same path as that generated by the light rays 68 and will thence be passed by reflection as indicated by the arrows 72 in FIG. 1 directly back to the light emitting tungsten filament 38 if, and only if, the light bulb assembly 24 is located so as to position the filament 38 exactly at the focal point of the parabolic reflector.

If the light source represented by the filament is located away from the focal point then the light will not generally trace paths back to the source as indicated in FIG. 1. For example, in FIG. 2, the light emitting filament 38 is shown in position with respect to a diagrammatically illustrated reflector 16 and the diagrammatically illustrated planar mirror 62 at a point ahead of the focal point of the reflector 16. It will be seen that in this case the light rays from the reflector are either directed away from the reflector 16 or will miss the reflector surface 64 but in either case will not retrace a path back to the light emitting source. Likewise, in FIG. 3, a light pattern produced by the light emitting source located behind the focal point is illustrated. Again, in this case, light is reflected from the plain mirror in a manner such that the light will not retrace paths directly back to the light emitting source. In a still further case, which is obviated by proper fixturing of a mirror 62 with respect to the reflector 16, the reflector 16 and light emitting filament are shown with the planar mirror angularly offset from the optical axis from a normal relationship therewith. Again, in this case, light is not reflected to retrace paths directly back to the light emitting source.

In each of the cases illustrated in FIGS. 2, 3 and 4, the electrical resistance property of the filament 38 will differ from that when the light emitting filament 38 is at the optical focal point of the reflector 16 as shown in FIG. 1.

In practicing the method of the present invention, the planar mirror 62 is located normal to the optical axis 66. Then the light bulb assembly 24 is energized so that light will be emitted from the filament 38. The support disc 46 is slidably supported in the reference flange 30 and is adjusted fore or aft with respect to the optical focal point of the reflector 16. In cases where the light is not at the focal point as illustrated in FIGS. 2 and 3, the resistance level of the filament will be reduced as compared to its resistance at the focal point location.

When the light rays retrace the paths as illustrated in FIG. 1, radiated light is substantially reflected back to the source through paths 70, 72, to cause the energy of the reflected light to produce an increase in the temperature of the filament 38. Since the source is an electrically heated tungsten filament, the increased temperature thereof will produce a resistant increase across the terminals 34, 36 which will be detected by use of voltage or current monitoring devices.

In the illustrated arrangement, the source of energization for the filament 38 is in the form of a constant current source. The power supply is illustrated at 74. In one operating mode of the invention, the unit was a Trygon-M-36-25A model. The power supply 74 has electrical leads 76, 78 thereon. Lead 76 is connected respectively to the connection pin 52 which in turn is electrically connected to the filament 38. The lead 78 is electrically connected to the support disc 46 which is in turn electrically connected to the terminal 36. Since the electrical supply for the filament 38 is held at constant current, then the voltage across leads 76, 78 will increase measurably when the electrical resistance 38 is moved into the focal point position shown in FIG. 1. The source voltage is detected by means of a voltmeter 80 electrically connected across leads 76, 78. In one working system the voltmeter was a Weston Model 1293. In operation, the current is held constant by the power supply 74 and the bulb position is adjusted as set forth above until a maximum voltage reading occurs on the unit 80.

Alternatively, if the electrical supply for the tungsten filament 38 is held at constant voltage, then the source current will drop measurably when the filament is moved into focus. In such cases, the power supply 74 is selected to produce a constant voltage and an ammeter will replace the voltmeter 80 as shown in FIG. 1.

Accuracy of the filament position 38 will be dependent upon the quality of the instrument used to measure either voltage or current changes. A higher resolution current meter or voltmeter will enable extremely accurate positioning of the filament.

While the embodiments of the present invention, as herein disclosed, constitute a preferred form, it is to be understood that other forms might be adopted.

What is claimed:

1. A method for aligning a filament light source at a focal point of a reflector to produce parallel light rays from the reflector comprising the steps of preforming a reflector with a filament support opening, supporting a filament support for axial and angular movement with respect to said opening, locating a flat mirror in facing relationship with the light reflecting surface of the reflector with a flat reflecting surface on said mirror being located normal to the optic axis of the reflector to reflect light rays back to the filament to heat the filament, connecting a reference power supply across the terminals of the filament to energize the filament to direct light rays from the reflector for return from the flat mirror back to the light source, adjusting the position of the filament with respect to the reflector, sensing the power supply to produce an electrical signal therefrom reflecting maximum filament temperature and resultant change in the electrical resistance of the filament as produced by the location of the filament on the reflector focal point, and thereafter fixing the filament support at its axially adjusted position in the opening.

2. A method for aligning a filament light source at a focal point to produce parallel light rays from a parabolic reflector with a filament support opening, supporting a filament support for axial and angular movement with respect to said opening, locating a flat mirror in facing relationship with the light reflecting surface of said parabolic reflector with a flat reflecting surface on said mirror being located normal to the optic axis of the parabolic reflector to reflect light rays back toward the filament, electrically energizing the filament across a constant current power source, connecting a voltmeter across the terminals of said filament, adjusting the position of the filament with respect to the reflector until light rays from the mirror impinge on the filament to heat it to produce an electrical signal to the voltmeter reflecting maximum filament temperature and filament resistance as produced by the location of the filament at the reflector focal point.

3. A method for aligning a filament light source at a focal point to produce parallel light rays from a parabolic reflector comprising the steps of preforming a parabolic reflector with a filament support opening, supporting a filament support for axial and angular movement with respect to said opening, locating a flat mirror in facing relationship with the light reflecting surface of said parabolic reflector with a flat reflecting surface on said mirror being located normal to the optic axis of the parabolic reflector to reflect light rays back toward the filament, electrically energizing the filament across a constant voltage power source, connecting an ammeter across the terminals of said filament, adjusting the position of the filament with respct to the reflector until light rays from the mirror impinge on the filament to heat it to produce an electrical signal to the ammeter reflecting maximum filament temperature and filament resistance as produced by the location of the filament at the reflector focal point.

* * * * *